United States Patent
Lim et al.

(10) Patent No.: US 12,173,222 B2
(45) Date of Patent: Dec. 24, 2024

(54) HIGH HEAT DISSIPATION POLYMER COMPOSITE MATERIAL SHEET AND MANUFACTURING METHOD THEREOF

(71) Applicant: SAMDO ATS CO., LTD., Hwaseong-si (KR)

(72) Inventors: Taeyoon Lim, Seoul (KR); Hongsoo Kim, Hwaseong-si (KR); Jaeseung Yoo, Seoul (KR); In Hwan Jang, Pocheon-si (KR); Hyeok Park, Seoul (KR)

(73) Assignee: SAMDO ATS CO., LTD., Hwaseong-si (KR)

( * ) Notice: Subject to any disclaimer, the term of this patent is extended or adjusted under 35 U.S.C. 154(b) by 201 days.

(21) Appl. No.: 18/105,513

(22) Filed: Feb. 3, 2023

(65) Prior Publication Data
US 2024/0124757 A1    Apr. 18, 2024

(30) Foreign Application Priority Data
Oct. 14, 2022  (KR) .......................... 10-2022-0132243

(51) Int. Cl.
| | | |
|---|---|---|
| C08J 5/18 | (2006.01) | |
| B29C 43/00 | (2006.01) | |
| C08G 59/50 | (2006.01) | |
| C08J 3/205 | (2006.01) | |
| C08K 9/06 | (2006.01) | |

(Continued)

(52) U.S. Cl.
CPC .............. *C09K 5/14* (2013.01); *B29C 43/003* (2013.01); *C08G 59/5073* (2013.01); *C08J 3/2053* (2013.01); *C08J 5/18* (2013.01); *C08K 9/06* (2013.01); *C09C 3/12* (2013.01); *B29C 2043/3205* (2013.01); *C01P 2002/76* (2013.01); *C01P 2004/61* (2013.01); *C01P 2006/32* (2013.01); *C08J 2363/00* (2013.01); *C08K 2201/001* (2013.01); *C08K 2201/005* (2013.01)

(58) Field of Classification Search
CPC .... C09K 5/14; C08G 59/5073; C01P 2006/32
See application file for complete search history.

(56) References Cited

FOREIGN PATENT DOCUMENTS

| | | | | | |
|---|---|---|---|---|---|
| CN | 102516766 A | * | 6/2012 | ............... | C08L 79/08 |
| CN | 105315943 A | * | 2/2016 | ............ | C01J 163/00 |

(Continued)

*Primary Examiner* — Atul P. Khare
(74) *Attorney, Agent, or Firm* — Paratus Law Group, PLLC

(57) ABSTRACT

There is provided a method for manufacturing a heat dissipation film. The method includes preparing a first mixture by mixing hexagonal boron nitride and an organic solvent, performing primary surface-modification on the hexagonal boron nitride, adding an amine-based silane compound to the first mixture, and then performing secondary surface-modification on the hexagonal boron nitride, preparing a second mixture by obtaining the secondarily surface-modified hexagonal boron nitride, and mixing the secondarily surface-modified hexagonal boron nitride, an imidazole-based curing agent, and an organic solvent, dispersing the second mixture, adding an epoxy resin to the second mixture, and then performing dispersion, and drying the organic solvent in the second mixture, and manufacturing a film using a product obtained by the drying.

2 Claims, 1 Drawing Sheet

(51) Int. Cl.
*C09C 3/12* (2006.01)
*C09K 5/14* (2006.01)
*B29C 43/32* (2006.01)

(56) References Cited

FOREIGN PATENT DOCUMENTS

| CN | 106243715 A | * | 12/2016 | ............. B29C 43/02 |
| CN | 110524922 A | * | 12/2019 | ............... B29D 7/01 |
| JP | 2015187057 A | * | 10/2015 | ........... C01B 21/064 |
| KR | 20130051456 A | * | 5/2013 | ............... C08K 3/00 |
| KR | 10-2022-0057944 A | | 5/2022 | |

* cited by examiner

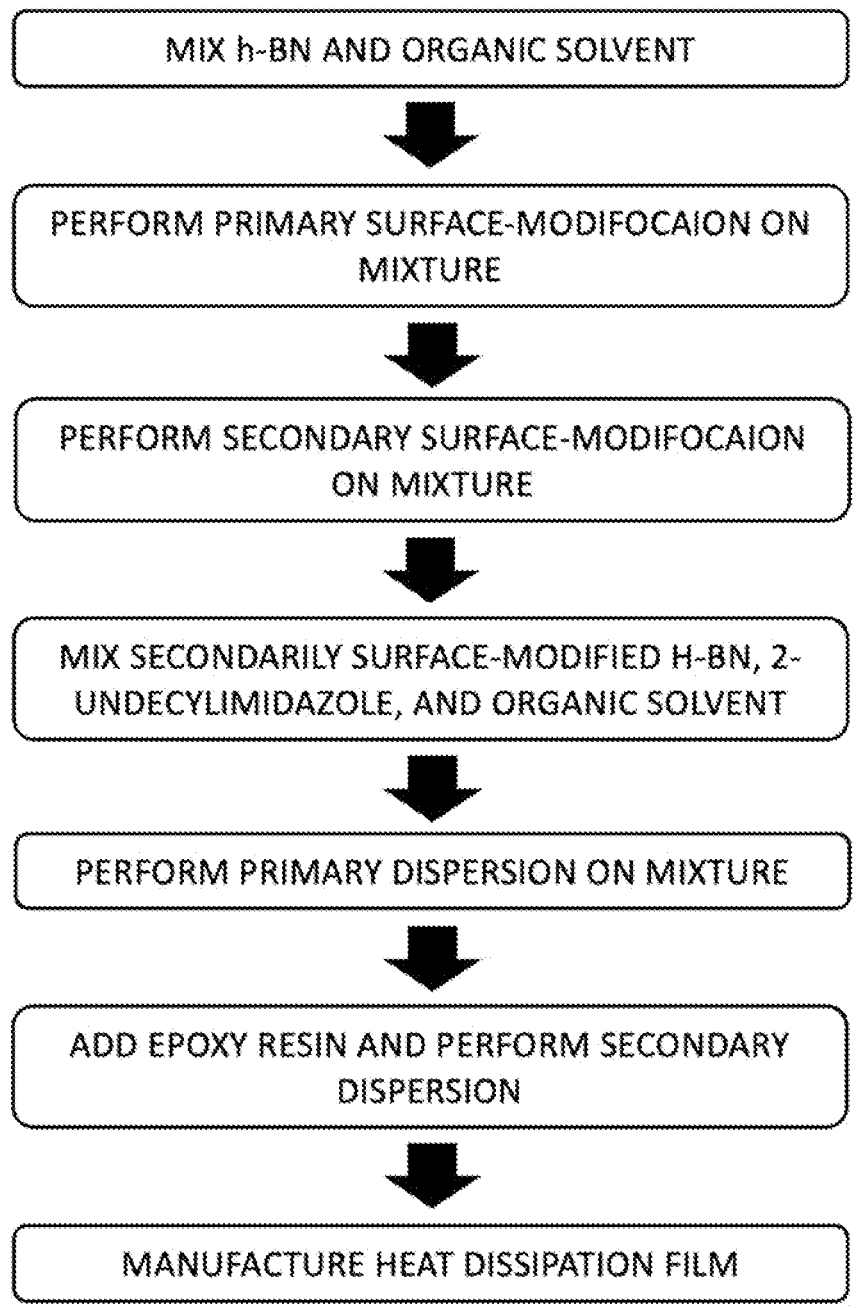

HIGH HEAT DISSIPATION POLYMER COMPOSITE MATERIAL SHEET AND MANUFACTURING METHOD THEREOF

ACKNOWLEDGEMENT

The present invention has been derived from research conducted with the research grant support of the purchase conditional new product development project (purchase-linked type) of the Ministry of Small and Medium-sized Enterprises (SMEs) and Startups.

[Project No.: S2950540, Research Project Title: Development of low-dielectric constant/low-loss high-heat dissipation polymer composite material sheet applied to 20 Hz]

CROSS-REFERENCE TO RELATED APPLICATION

This application claims priority under 35 U.S.C. § 119 to Korean Patent Application No. 10-2022-0132243 (filed on Oct. 14, 2022), which is hereby incorporated by reference in its entirety.

BACKGROUND

The present invention relates to a high heat dissipation polymer composite material sheet and a manufacturing method thereof.

Due to the high integration of electronic components/products and the increase in power consumption, there is a trend in that the usage range and amount of thermally conductive materials are significantly increasing. A thermally conductive material including an typical metal has low formability and productivity, so that there have been many efforts to replace a metal composite by using a material with excellent formability and productivity. Therefore, in order to increase thermal conductivity and injection formability, a composite composed of a thermally conductive filler such as ceramics and carbon and a polymer is used to replace a certain portion of the metal.

Heat transfer from ceramics to an electrical insulator is mainly caused by lattice vibration caused by phonons instead of free electrons, and phonon scattering generated at this time is mainly induced by thermal resistance, which is related to the existence of a thermal barrier between the matrix and the filler. Therefore, research has been conducted to increase the mobility of phonons by suppressing scattering.

Most polymer materials have a low thermal conductivity value of about 0.1 to 0.3 W/mK, and a polymer with high crystallinity exhibits a higher thermal conductivity value than an amorphous polymer. Therefore, it is advantageous to select a crystalline polymer as a matrix when preparing a thermally conductive composite material, but there is a problem in that processing conditions of the crystalline polymer are more difficult than those of an amorphous polymer.

In addition to the above, if a filler having a various particle size distribution is selected and a polymer with a low melt viscosity capable of improving the interfacial adhesion and wettability of the filler and a polymer matrix is used, pore formation functionality of a polymer composite material is reduced, which is effective in improving thermal conductivity of the composite material, but it is not applicable when compatibility between the polymer and the filler is not good.

Meanwhile, boron nitride (BN) is an insulating ceramic, and is known to have various crystal forms, such as c-BN having a diamond structure, h-BN having a graphite structure, a-BN having a single-layered structure, and the like. Among these, hexagonal boron nitride (h-BN) has a layered structure like graphite, is relatively easy to synthesize, and has excellent thermal conductivity, corrosion resistance, heat resistance, and electrical insulation, and thus is used as an additive in a substrate used for various electric and electronic products. Particularly, the hexagonal boron nitride has the property of having high thermal conductivity despite having insulating properties, and thus is attracting great attention as a filler for a heat dissipation member (referred to as a heat dissipation filler or an insulation heat dissipation filler) in the electrical and electronic field.

PRIOR ART DOCUMENT

Patent Document

Patent Document 1: Korean Patent Laid-Open Publication No. 10-2022-0057944

SUMMARY

The present invention has been devised to solve the above-mentioned problem and provides a high heat dissipation polymer composite material sheet having high thermal conductivity.

The problem to be solved by the present invention is not limited to the above-mentioned problem, and other problems that are not mentioned may be apparent to those skilled in the art from the following description.

In accordance with an exemplary embodiment of the present invention, a method for manufacturing a heat dissipation film includes preparing a first mixture by mixing hexagonal boron nitride and an organic solvent, performing primary surface-modification on the hexagonal boron nitride by applying ultrasonic waves of 100 W to 500 W to the first mixture for 1 hour to 4 hours at a temperature of 20° C. to 40° C., adding an amine-based silane compound to the first mixture containing the primarily surface-modified hexagonal boron nitride, and then performing secondary surface-modification on the hexagonal boron nitride by applying ultrasonic waves of 100 W to 500 W thereto for 4 hours to 8 hours at a temperature of 60° C. to 80° C., preparing a second mixture by obtaining the secondarily surface-modified hexagonal boron nitride, and mixing the secondarily surface-modified hexagonal boron nitride, an imidazole-based curing agent, and an organic solvent, dispersing the second mixture by applying ultrasonic waves of 50 W to 150 W thereto for 5-7 hours at a temperature of 20° C. to 40° C., adding an epoxy resin to the second mixture, and then performing dispersion by applying ultrasonic waves of 50 W to 150 W thereto for 30 minutes to 90 minutes at a temperature of 20° C. to 40° C., and drying the organic solvent in the second mixture, and manufacturing a film using a product obtained by the drying.

In addition, the hexagonal boron nitride may have a particle size of 9 μm, the primary surface-modification may be performed by applying ultrasonic waves of 400 W for 3 hours at a temperature of 40° C., the secondary surface-modification may be performed by applying ultrasonic waves of 300 W for 7 hours at a temperature of 80° C., the content of the amine-based silane compound added in the secondary surface-modification may be 15 parts by weight to 25 parts by weight based on 100 parts by weight of the hexagonal boron nitride, and the content of the epoxy resin added to the second mixture may be 20 pars by weight to 30 parts by weight based on 100 parts by weight of the secondarily surface-modified hexagonal boron nitride.

BRIEF DESCRIPTION OF THE DRAWINGS

Exemplary embodiments can be understood in more detail from the following description taken in conjunction with the accompanying drawings, in which:

FIG. 1 is a flowchart showing a method for manufacturing a heat dissipation film according to the present invention.

DETAILED DESCRIPTION

Hereinafter, various embodiments will be described in more detail with reference to the accompanying drawings. The embodiments described herein may be changed in various ways. Particular embodiments may be described in the drawings and described in detail in the detailed description. However, the particular embodiments disclosed in the accompanying drawings are only intended to facilitate understanding of various embodiments. Therefore, it should be understood that the technical spirit is not limited by the particular embodiments disclosed in the accompanying drawings, but includes all equivalents or alternatives included in the spirit and technical scope of the invention.

It will be understood that, although terms including ordinal numbers such as primary, secondary, first, and second may be used to describe various elements, these elements should not be limited by the above-described terms. The terms described above are used only for the purpose of distinguishing one element from another.

In the present specification, it should be understood that the terms 'comprise' or 'have' are intended to specify the presence of stated features, integers, steps, operations, elements, components, or combinations thereof in the disclosure, but do not preclude the presence or addition of one or more other features, integers, steps, operations, elements, components, or combinations thereof. When an element is referred to as being 'connected' or 'accessed' to other elements, the element may be directly connected or accessed to the other elements, but it should be also understood that another element may be present therebetween. On the other hand, when an element is referred to as being 'directly connected' or 'directly accessed' to other elements, it should be understood that there is no other element therebetween.

In addition, in describing the present invention, if it is determined that a detailed description of a related known function or configuration may unnecessarily obscure the gist of the present invention, the detailed description thereof will be abbreviated or omitted.

The present invention provides a method for manufacturing a heat dissipation film, wherein the method includes preparing a first mixture by mixing hexagonal boron nitride and an organic solvent, performing primary surface-modification on the hexagonal boron nitride by applying ultrasonic waves of 100 to 500 W to the first mixture for 1 hour to 4 hours at a temperature of 20° C. to 40° C., adding an amine-based silane compound to the first mixture containing the primarily surface-modified hexagonal boron nitride, and then performing secondary surface-modification on the hexagonal boron nitride by applying ultrasonic waves of 100 W to 500 W thereto for 4 hours to 8 hours at a temperature of 60° C. to 80° C., preparing a second mixture by obtaining the secondarily surface-modified hexagonal boron nitride, and mixing the secondarily surface-modified hexagonal boron nitride, an imidazole-based curing agent, and an organic solvent, dispersing the second mixture by applying ultrasonic waves of 50 W to 150 W thereto for 5-7 hours at a temperature of 20° C. to 40° C., adding an epoxy resin to the second mixture, and then performing dispersion by applying ultrasonic waves of 50 W to 150 W thereto for 30 minutes to 90 minutes at a temperature of 20° C. to 40° C., and drying the organic solvent in the second mixture, and manufacturing a film using a product obtained by the drying.

At this time, the method for manufacturing a heat dissipation film according to the present invention is shown in a flowchart in FIG. 1, and with reference to FIG. 1, the method for manufacturing a heat dissipation film according to the present invention is described in detail for each step.

First, the method for manufacturing a heat dissipation film according to the present invention includes preparing a first mixture by mixing hexagonal boron nitride and an organic solvent.

In the above step, the hexagonal boron nitride (hereinafter, h-BN) is mixed with the organic solvent to be surface-modified, thereby preparing the first mixture.

The h-BN is plate-shaped.

The h-BN preferably has a particle size of 1 to 9 μm, more preferably 1 to 3 μm, and most preferably 1 μm. The particle size means the longest length of the plate-shaped h-BN. When the particle size of the h-BN is less than 1 μm, thermal conductivity is low when the h-BN is applied as a filler, and when the particle size thereof is greater than 1 μm, it is difficult to apply the h-BN in a high content as a filler to a heat dissipation film, and thermal conductivity is also lowered.

Preferably, the organic solvent is N,N-Dimethylmethanamide (hereinafter, DMF).

Next, the method for manufacturing a heat dissipation film according to the present invention includes performing primary surface-modification on the hexagonal boron nitride by applying ultrasonic waves of 100 W to 500 W to the first mixture for 1 hour to 4 hours at a temperature of 20° C. to 40° C.

In the above step, the h-BN is primarily modified using a high-energy ultrasonic wave process.

The ultrasonic wave process is preferably performed using a horn ultrasonic wave device, and an edge portion of the h-BN is activated by performing the high-energy ultrasonic wave process using the horn ultrasonic wave device. Accordingly, chemical modification may be effectively performed. At this time, in consideration of a cavitation effect, the ultrasonic wave frequency of the ultrasonic wave device may be 20 to 50 kHz, preferably 25 to 40 kHz, and most preferably 28 kHz.

The cavitation effect is a phenomenon in which the pressure of a liquid decreases below vapor pressure when the liquid moves at a high speed, thereby generating vapor bubbles in the liquid. When ultrasonic waves above 20 kHz or higher are emitted into a solution, waves are generated inside the solution, positive pressure is generated in a direction in which the waves travel forward, and negative pressure is instantaneously generated just therebehind, resulting in forming millions of microspaces in the form of bubbles. These microspaces may instantaneously clump together and grow, but are violently crushed by positive pressure of ultrasonic waves subsequently generated, and although the time between the generation of the microspaces and the crushing thereof is only several milliseconds, powerful energy is generated when these microspaces are crushed. A reaction between a surface-treatment agent and nanoparticles is induced by using high-temperature and high-pressure energy generated by the cavitation effect, and the higher the frequency of ultrasonic waves, the smaller the size of bubbles, so that the penetration force becomes stronger, whereas the intensity of the cavitation effect decreases. Therefore, the frequency of ultrasonic waves optimized for surface-treatment and dispersion may vary depending on an inorganic filler used. In the present invention, it has been considered that an ultrasonic wave process is applied to an inorganic filler composed of low reactive h-BN, and it has been confirmed that it is ideal to use an ultrasonic wave device having a frequency of 20 to 50 kHz with a large cavitation effect, and that it is most ideal to use a horn ultrasonic wave device of 28 kHz when performing the ultrasonic wave process.

It is preferable that the primary surface-modification is performed by applying ultrasonic waves of 400 W to the first mixture for 3 hours at a temperature of 40° C. An inorganic filler composed of h-BN prepared by performing the primary surface-modification at the above temperature, with the above ultrasonic wave intensity, and during the above time is composited with an epoxy resin, thereby exhibiting excellent thermal conductivity.

Next, the method for manufacturing a heat dissipation film according to the present invention includes adding an amine-based silane compound to the first mixture containing the primarily surface-modified hexagonal boron nitride, and then performing secondary surface-modification on the hexagonal boron nitride by applying ultrasonic waves of 100 W to 500 W thereto for 4 hours to 8 hours at a temperature of 60° C. to 80° C.

In the above step, the h-BN is secondarily modified using a high-energy ultrasonic wave process.

The ultrasonic wave process is preferably performed using a horn ultrasonic wave device, and by performing the ultrasonic wave process with high energy using the horn ultrasonic wave device, chemical modification may be performed through a silane compound on the h-BN in which an edge portion is activated through the primary surface-modification.

The secondary surface-modification is preferably performed by applying ultrasonic waves of 300 W for 7 hours at a temperature of 80° C. An inorganic filler composed of h-BN prepared by performing the secondary surface-modification at the above temperature, with the above ultrasonic wave intensity, and during the above time is composited with an epoxy resin, thereby exhibiting excellent thermal conductivity.

The material added in the secondary surface-modification is an amine-based silane compound, and is preferably 3-[2-(2-aminoethylamino)ethylamino]propyl trimethoxy silane (hereinafter, TAMS). An inorganic filler composed of h-BN prepared by using TAMS as the amine-based silane compound is composited with an epoxy resin, thereby exhibiting excellent thermal conductivity.

The content of the TAMS added in the secondary surface-modification is preferably 15 to parts by weight based on 100 parts by weight of the hexagonal boron nitride, more preferably 18 to 22 parts by weight, and most preferably 20 parts by weight. An inorganic filler composed of h-BN prepared by applying a specific silane compound in the above content is composited with an epoxy resin, thereby exhibiting excellent thermal conductivity.

Next, the method for manufacturing a heat dissipation film according to the present invention includes preparing a second mixture by obtaining the secondarily surface-modified hexagonal boron nitride, and mixing the secondarily surface-modified hexagonal boron nitride, an imidazole-based curing agent, and an organic solvent.

In the above step, the second mixture for performing pre-treatment for forming a composite with an epoxy resin is prepared by using secondarily surface-modified h-BN, an imidazole-based curing agent, and an organic solvent.

Obtaining the secondarily surface-modified h-BN may be performed by filtering with filter paper, washing with DMF, which is an organic solvent, and N-methyl-2-pyrrolidone (hereinafter, NMP), to wash unreacted TAMS, followed by drying.

The imidazole-based curing agent is preferably 2-undecylimidazole.

The organic solvent is preferably DMF.

Next, the method for manufacturing a heat dissipation film according to the present invention includes dispersing the second mixture by applying ultrasonic waves of 50 W to 150 W thereto for 5-7 hours at a temperature of 20° C. to 40° C.

In the above step, the ultrasonic waves are applied using the second mixture. By applying ultrasonic waves to the second mixture containing the secondarily surface-modified hexagonal boron nitride, the imidazole, and the organic solvent for a long time, micro-defects on the surface of the secondarily surface-modified hexagonal boron nitride are removed to increase surface bonding. It is difficult for micropores at the interface to be filled by a polymer, and the surface of a plane portion of the secondarily surface-modified hexagonal boron nitride has low affinity with the polymer, so that a depletion layer is formed. The micropores and the depletion layer cause an increase in phonon scattering, thereby reducing thermal conductivity, and dielectric loss increases due to active vibration of a dipole at the interface. Accordingly, in the present invention, it is possible to suppress phonon scattering and an increase in dielectric loss due to an interfacial effect by applying ultrasonic waves of 80 W to 120 W for 5.5 hours to 6.5 hours at a temperature of 25° C. to 35° C., preferably ultrasonic waves of 100 W for 6 hours at a temperature of 30° C., thereby removing micro-defects of the secondarily surface-modified hexagonal boron nitride.

Next, the method for manufacturing a heat dissipation film according to the present invention includes adding an epoxy resin to the second mixture, and then performing dispersion by applying ultrasonic waves of 50 W to 150 W thereto for 30 minutes to 90 minutes at a temperature of 20° C. to 40° C.

The dispersion process proceeds in two stages, wherein a primary dispersion process is performed using the second mixture by applying ultrasonic waves of 50 W to 150 W thereto for to 7 hours at a temperature of 20° C. to 40° C., and then a secondary dispersion process is performed by adding an epoxy resin to the second mixture and then applying ultrasonic waves of 50 W to 150 W thereto for 30 minutes to 90 minutes at a temperature of 20° C. to 40° C.

Through the two-stage dispersion process, the performance of hexagonal boron nitride, which is a filler, is improved and the interfacial adhesion between the filler and the epoxy resin, which is a polymer, is also improved, so that a heat dissipation film with further excellent performance may be manufactured.

More preferably, ultrasonic waves of 80 W to 120 W are applied for 50 minutes to 70 minutes at a temperature of 25° C. to 35° C., and more preferably, ultrasonic waves of 100 W are applied for 60 minutes at a temperature of 30° C.

The content of the epoxy resin added to the second mixture is preferably 20 parts by weight to 30 parts by weight based on 100 parts by weight of the secondarily surface-modified h-BN, more preferably 23 parts by weight to 27 parts by weight, and most preferably 25 parts by weight. Since the mixing ratio of the secondarily surface-modified h-BN and the epoxy resin shows a weight ratio of 4:1, higher thermal conductivity may be achieved.

Next, the method for manufacturing a heat dissipation film according to the present invention includes drying the organic solvent in the second mixture, and manufacturing a film using a product obtained by the drying.

In the above step, the film is finally manufactured.

The manufacturing of the film may be performed by a hot press process.

Hereinafter, the present invention will be described in more detail with reference to the following Examples.

However, the following Examples and Experimental examples are merely illustrative of the content of the present invention, and the scope of the present invention is not limited by the Examples and Experimental Examples.

<Preparation Examples 1 to 26> Preparation of Inorganic Filler 50 g of hexagonal boron nitride (h-BN) having a size of 1 μm and 1000 ml of N,N-Dimethylmethanamide (DMF) were mixed to prepare a first mixture.

The first mixture was placed in a horn ultrasonic wave device (28 kHz), and then ultrasonic waves of 100 W to 500 W were applied thereto for 1 hour to 4 hours at a temperature of 10° C. to 50° C. to perform primary surface-modification while peeling the h-BN.

Thereafter, 10 g of 3-[2-(2-aminoethylamino)ethylamino] propyl trimethoxy silane (TAMS), 3-(2-aminoethylamino) propyl trimethoxysilane (DAMS), or 3-Aminopropylt-rimethoxysilane (APMS) was added to the first mixture, and then ultrasonic waves of 100 W to 500 W were applied thereto for 4 hours to 8 hours at a temperature of 50° C. to 90° C. to perform secondary surface-modification of the h-BN.

Finally, the mixture was filtered using filter paper, and the solids were washed by being sprayed with DMF and NMP, and dried to prepare modified h-B N, which is an inorganic filler.

The process conditions of each preparation example are shown in Table 1 and Table 2 below.

TABLE 1

| | Primary surface-modification process | | | Secondary surface-modification process | | | |
|---|---|---|---|---|---|---|---|
| | Process temperature (° C.) | Ultrasonic wave Intensity (W) | Process time (time) | Silane compound Type | Process temperature (° C.) | Ultrasonic wave Intensity (W) | Process time (time) |
| Preparation Example 1 | 10 | 300 | 2 | TAMS | 70 | 300 | 6 |
| Preparation Example 2 | 20 | 300 | 2 | TAMS | 70 | 300 | 6 |
| Preparation Example 3 | 30 | 300 | 2 | TAMS | 70 | 300 | 6 |
| Preparation Example 4 | 40 | 300 | 2 | TAMS | 70 | 300 | 6 |
| Preparation Example 5 | 50 | 300 | 2 | TAMS | 70 | 300 | 6 |
| Preparation Example 6 | 40 | 100 | 2 | TAMS | 70 | 300 | 6 |
| Preparation Example 7 | 40 | 200 | 2 | TAMS | 70 | 300 | 6 |
| Preparation Example 8 | 40 | 400 | 2 | TAMS | 70 | 300 | 6 |
| Preparation Example 9 | 40 | 500 | 2 | TAMS | 70 | 300 | 6 |
| Preparation Example 10 | 40 | 400 | 1 | TAMS | 70 | 300 | 6 |
| Preparation Example 11 | 40 | 400 | 3 | TAMS | 70 | 300 | 6 |
| Preparation Example 12 | 40 | 400 | 4 | TAMS | 70 | 300 | 6 |

TABLE 2

| | Primary surface-modification process | | | Secondary surface-modification process | | | |
|---|---|---|---|---|---|---|---|
| | Process temperature (° C.) | Ultrasonic wave Intensity (W) | Process time (time) | Silane compound Type | Process temperature (° C.) | Ultrasonic wave Intensity (W) | Process time (time) |
| Preparation Example 13 | 40 | 400 | 3 | DAMS | 70 | 300 | 6 |
| Preparation Example 14 | 40 | 400 | 3 | APMS | 70 | 300 | 6 |
| Preparation Example 15 | 40 | 400 | 3 | TAMS | 50 | 300 | 6 |

TABLE 2-continued

|  | Primary surface-modification process | | | Secondary surface-modification process | | | |
| --- | --- | --- | --- | --- | --- | --- | --- |
|  | Process temperature (° C.) | Ultrasonic wave Intensity (W) | Process time (time) | Silane compound Type | Process temperature (° C.) | Ultrasonic wave Intensity (W) | Process time (time) |
| Preparation Example 16 | 40 | 400 | 3 | TAMS | 60 | 300 | 6 |
| Preparation Example 17 | 40 | 400 | 3 | TAMS | 80 | 300 | 6 |
| Preparation Example 18 | 40 | 400 | 3 | TAMS | 90 | 300 | 6 |
| Preparation Example 19 | 40 | 400 | 3 | TAMS | 80 | 100 | 6 |
| Preparation Example 20 | 40 | 400 | 3 | TAMS | 80 | 200 | 6 |
| Preparation Example 21 | 40 | 400 | 3 | TAMS | 80 | 400 | 6 |
| Preparation Example 22 | 40 | 400 | 3 | TAMS | 80 | 500 | 6 |
| Preparation Example 23 | 40 | 400 | 3 | TAMS | 80 | 300 | 4 |
| Preparation Example 24 | 40 | 400 | 3 | TAMS | 80 | 300 | 5 |
| Preparation Example 25 | 40 | 400 | 3 | TAMS | 80 | 300 | 7 |
| Preparation Example 26 | 40 | 400 | 3 | TAMS | 80 | 300 | 8 |

<Examples 1 to 26> Manufacturing of Heat Dissipation Film

A heat dissipation film was manufactured using the inorganic filler prepared in each of Preparation Examples 1 to 26 above.

30 g of the inorganic filler prepared in each of Preparation Examples 1 to 26 above, 3 g of 2-undecylimidazole, and 600 ml of DMF were mixed to prepare a second mixture.

The second mixture was dispersed by applying ultrasonic waves of 100 W for 6 hours at a temperature of 30° C. Thereafter, 6 g of an epoxy resin (YD128) was added to the second mixture, and ultrasonic waves of 100 W were applied thereto for 60 minutes at a temperature of 30° C. to disperse the mixture.

The organic solvent was dried in the second mixture and a product obtained by the drying was used to manufacture the heat dissipation film through a hot press process.

Comparative Example 1

A heat dissipation film was manufactured using the inorganic filler prepared in Preparation Example 25 above.

30 g of the inorganic filler prepared in Preparation Example 25 above, 3 g of 2-undecylimidazole, 6 g of an epoxy resin (YD128), and 600 ml of DMF were mixed to prepare a second mixture.

The second mixture was dispersed by applying ultrasonic waves of 100 W for 1 hours at a temperature of 30° C.

The organic solvent was dried in the second mixture and a product obtained by the drying was used to manufacture the heat dissipation film through a hot press process.

<Experimental Example 1> Analysis of Thermal Conductivity

In order to confirm the thermal conductivity of the heat dissipation film manufactured in each of Examples 1 to 26 and Comparative Example 1, the out-of-plane thermal conductivity of the heat dissipation film manufactured in each of Examples 1 to 26 and Comparative Example 1 was measured, and the results are shown in Table 3 below.

TABLE 3

|  | Example 1 | Example 2 | Example 3 | Example 4 | Example 5 | Example 6 | Example 7 |
| --- | --- | --- | --- | --- | --- | --- | --- |
| Thermal conductivity (W/mK) | 2.01 | 2.36 | 2.80 | 2.94 | 2.72 | 2.58 | 2.90 |

|  | Example 8 | Example 9 | Example 10 | Example 11 | Example 12 | Example 13 | Example 14 |
| --- | --- | --- | --- | --- | --- | --- | --- |
| Thermal conductivity (W/mK) | 3.05 | 2.87 | 2.82 | 3.40 | 3.34 | 3.12 | 2.98 |

|  | Example 15 | Example 16 | Example 17 | Example 18 | Example 19 | Example 20 | Example 21 |
| --- | --- | --- | --- | --- | --- | --- | --- |
| Thermal conductivity (W/mK) | 2.94 | 3.25 | 3.65 | 2.95 | 2.84 | 3.09 | 3.10 |

TABLE 3-continued

|  | Example 22 | Example 23 | Example 24 | Example 25 | Example 26 | Comparative Example 1 |
|---|---|---|---|---|---|---|
| Thermal conductivity (W/mK) | 3.21 | 3.34 | 3.60 | 3.74 | 3.58 | 3.01 |

Referring to Examples 1 to 5 above, it was confirmed that the thermal conductivity, which is the performance of the prepared inorganic filler and the performance of the heat dissipation film manufactured using the inorganic filler, changed depending on the process temperature of the primary surface-modification process, and that the thermal conductivity of the heat dissipation film of Example 4 was excellent at 2.94 W/mK.

Referring to Examples 4, and 6 to 9 above, it was confirmed that the thermal conductivity, which is the performance of the prepared inorganic filler and the performance of the heat dissipation film manufactured using the inorganic filler, changed depending on the intensity of ultrasonic waves of the primary surface-modification process, and that the thermal conductivity of the heat dissipation film of Example 8 was excellent at 3.05 W/mK.

Referring to Examples 8, and 10 to 12 above, it was confirmed that the thermal conductivity, which is the performance of the prepared inorganic filler and the performance of the heat dissipation film manufactured using the inorganic filler, changed depending on the process time applied to the primary surface-modification process, and that the thermal conductivity of the heat dissipation film of Example 11 was excellent at 3.40 W/mK.

Referring to Examples 11, 13, and 14 above, it was confirmed that the thermal conductivity, which is the performance of the prepared inorganic filler and the performance of the heat dissipation film manufactured using the inorganic filler, changed depending on the type of a silane compound applied to the secondary surface-modification process, and that the thermal conductivity of the heat dissipation film of Example 11 was excellent at 3.40 W/mK.

Referring to Examples 11, and 15 to 18 above, it was confirmed that the thermal conductivity, which is the performance of the prepared inorganic filler and the performance of the heat dissipation film manufactured using the inorganic filler, changed depending on the process temperature of the secondary surface-modification process, and that the thermal conductivity of the heat dissipation film of Example 17 was excellent at 3.65 W/mK.

Referring to Examples 17, and 19 to 22 above, it was confirmed that the thermal conductivity, which is the performance of the prepared inorganic filler and the performance of the heat dissipation film manufactured using the inorganic filler, changed depending on the intensity of ultrasonic waves of the secondary surface-modification process, and that the thermal conductivity of the heat dissipation film of Example 17 was excellent at 3.65 W/mK.

Referring to Examples 17, and 23 to 26 above, it was confirmed that the thermal conductivity, which is the performance of the prepared inorganic filler and the performance of the heat dissipation film manufactured using the inorganic filler, changed depending on the time of the secondary surface-modification process, and that the thermal conductivity of the heat dissipation film of Example 25 was excellent at 3.74 W/mK.

Referring to Example 25 and Comparative Example 1, it can be seen that the performance of the heat dissipation film of Example 25 in which the two-stage dispersion process was performed was excellent.

A heat dissipation film manufactured by a method for manufacturing a heat dissipation film according to the present invention is a filler surface-modified to enhance interfacial adhesion with an epoxy resin, and has excellent thermal conductivity by including a plate-shaped hexagonal boron nitride.

Although the high heat dissipation polymer composite material sheet and manufacturing method thereof has(have) been described with reference to the specific embodiments, it (they) is(are) not limited thereto. Therefore, it will be readily understood by those skilled in the art that various modifications and changes can be made thereto without departing from the spirit and scope of the present invention defined by the appended claims.

What is claimed is:

1. A method for manufacturing a heat dissipation film, the method comprising:
    preparing a first mixture by mixing hexagonal boron nitride and an organic solvent;
    performing primary surface-modification on the hexagonal boron nitride by applying ultrasonic waves of 100 to 500 W to the first mixture for 1 to 4 hours at a temperature of 20° C. to 40° C.;
    adding an amine-based silane compound to the first mixture containing the primarily surface-modified hexagonal boron nitride, and then performing secondary surface-modification on the primarily surface-modified hexagonal boron nitride by applying ultrasonic waves of 100 W to 500 W thereto for 4 hours to 8 hours at a temperature of 60° C. to 80° C.;
    preparing a second mixture by obtaining the secondarily surface-modified hexagonal boron nitride, and mixing the secondarily surface-modified hexagonal boron nitride, an imidazole-based curing agent, and an organic solvent;
    dispersing the second mixture by applying ultrasonic waves of 50 W to 150 W thereto for 5-7 hours at a temperature of 20° C. to 40° C.;
    adding an epoxy resin to the second mixture, and then performing dispersion by applying ultrasonic waves of 50 W to 150 W thereto for 30 minutes to 90 minutes at a temperature of 20° C. to 40° C.; and
    drying the organic solvent in the second mixture, and manufacturing a film using a product of the second mixture obtained by the drying.

2. The method of claim 1, wherein:
    the hexagonal boron nitride has a particle size of 9 μm;
    the primary surface-modification is performed by applying ultrasonic waves of 400 W for 3 hours at a temperature of 40° C.;
    the secondary surface-modification is performed by applying ultrasonic waves of 300 W for 7 hours at a temperature of 80° C.;

the content of the amine-based silane compound added to the first mixture is 15 parts by weight to 25 parts by weight based on 100 parts by weight of the hexagonal boron nitride; and the content of the epoxy resin added to the second mixture is 20 parts by weight to 30 parts by weight based on 100 parts by weight of the secondarily surface-modified hexagonal boron nitride.

\* \* \* \* \*